United States Patent
Hashimoto et al.

(10) Patent No.: US 11,248,553 B2
(45) Date of Patent: *Feb. 15, 2022

(54) VEHICLE CONTROL DEVICE, VEHICLE CONTROL SYSTEM, AND VEHICLE CONTROL METHOD

(71) Applicant: TOYOTA JIDOSHA KABUSHIKI KAISHA, Toyota (JP)

(72) Inventors: Yohsuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/063,203

(22) Filed: Oct. 5, 2020

(65) Prior Publication Data

US 2021/0115870 A1    Apr. 22, 2021

(30) Foreign Application Priority Data

Oct. 18, 2019   (JP) .............................. JP2019-191094

(51) Int. Cl.
*F02D 41/24* (2006.01)
*G06Q 30/00* (2012.01)
(Continued)

(52) U.S. Cl.
CPC ......... *F02D 41/2425* (2013.01); *G06N 20/00* (2019.01); *G06Q 30/018* (2013.01);
(Continued)

(58) Field of Classification Search
CPC ............ F02D 41/2425; F02D 2200/50; F02D 2200/101; F02D 2200/0625;
(Continued)

(56) References Cited

U.S. PATENT DOCUMENTS

| 5,410,477 A | 4/1995 | Ishii et al. |
| 6,549,815 B1 | 4/2003 | Kaji |

(Continued)

FOREIGN PATENT DOCUMENTS

| ES | 2 286 958 A1 | 12/2007 |
| JP | 4-293626 A | 10/1992 |

(Continued)

*Primary Examiner* — Joseph J Dallo
(74) *Attorney, Agent, or Firm* — Oblon, McClelland, Maier & Neustadt, L.L.P.

(57) ABSTRACT

A vehicle control device includes a storage device and a processor. The storage device is configured to store relationship prescription data that prescribe a relationship between a state of a vehicle and an action variable that is a variable related to an operation of an electronic device in the vehicle. The processor is configured to calculate a reward corresponding to the operation of the electronic device. The processor is configured to update the relationship prescription data using, as inputs to updated mapping determined in advance, the state of the vehicle that is based on a detection value that is acquired, a value of the action variable that is used to operate the electronic device, and the reward corresponding to the operation of the electronic device when a computation load on the processor is equal to or less than a predetermined load.

20 Claims, 5 Drawing Sheets

(51) Int. Cl.
*G06Q 50/06* (2012.01)
*G07C 5/08* (2006.01)
*G06N 20/00* (2019.01)

(52) U.S. Cl.
CPC ............ *G06Q 50/06* (2013.01); *G07C 5/0808* (2013.01); *F02D 2200/0625* (2013.01); *F02D 2200/101* (2013.01); *F02D 2200/50* (2013.01); *F02D 2200/602* (2013.01)

(58) Field of Classification Search
CPC ............ F02D 2200/602; G06Q 30/018; G06Q 50/06; G07C 5/0808; G06N 20/00
See application file for complete search history.

(56) References Cited

U.S. PATENT DOCUMENTS

| | | | | |
|---|---|---|---|---|
| 6,837,217 | B1* | 1/2005 | Hoshino | F02D 11/105 123/399 |
| 2002/0157639 | A1* | 10/2002 | Kidokoro | F02D 41/221 123/396 |
| 2003/0055551 | A1* | 3/2003 | Weber | F02D 11/105 701/93 |
| 2004/0098197 | A1* | 5/2004 | Matsumoto | B62D 1/286 701/301 |
| 2010/0204899 | A1* | 8/2010 | Serres | F02D 37/02 701/103 |
| 2018/0066593 | A1 | 3/2018 | Uezono et al. | |
| 2018/0072317 | A1* | 3/2018 | Hiwatashi | B60W 30/1882 |
| 2018/0086349 | A1* | 3/2018 | Hiwatashi | B60W 10/04 |
| 2019/0242319 | A1 | 8/2019 | Matsumoto et al. | |
| 2019/0360421 | A1* | 11/2019 | Cancellieri | F02D 41/144 |
| 2021/0033039 | A1* | 2/2021 | Hashimoto | F02D 41/2454 |
| 2021/0056781 | A1* | 2/2021 | Hashimoto | F02D 41/1497 |
| 2021/0114581 | A1* | 4/2021 | Hashimoto | G06K 9/6262 |
| 2021/0114596 | A1* | 4/2021 | Hashimoto | B60W 10/06 |
| 2021/0114608 | A1* | 4/2021 | Hashimoto | F02D 41/28 |
| 2021/0115871 | A1* | 4/2021 | Hashimoto | G06K 9/00845 |

FOREIGN PATENT DOCUMENTS

| | | |
|---|---|---|
| JP | 10-254505 A | 9/1998 |
| JP | 2000-250604 A | 9/2000 |
| JP | 2009-19523 A | 1/2009 |
| JP | 2009-167968 A | 7/2009 |
| JP | 2016-6327 A | 1/2016 |
| JP | 2016-169686 A | 9/2016 |
| JP | 2019-519851 A | 7/2019 |
| JP | 2019-144748 A | 8/2019 |
| WO | WO 2018/084324 A1 | 5/2018 |
| WO | WO 2018/105703 A1 | 6/2018 |

* cited by examiner

VEHICLE CONTROL DEVICE, VEHICLE CONTROL SYSTEM, AND VEHICLE CONTROL METHOD

INCORPORATION BY REFERENCE

The disclosure of Japanese Patent Application No. 2019-191094 filed on Oct. 18, 2019 including the specification, drawings and abstract is incorporated herein by reference in its entirety.

BACKGROUND

1. Technical Field

The present disclosure relates to a vehicle control device, a vehicle control system, and a vehicle control method.

2. Description of Related Art

Japanese Unexamined Patent Application Publication No. 2016-6327 (JP 2016-6327 A), for example, describes a control device that operates a throttle valve, which is an operable portion of an internal combustion engine mounted on a vehicle, based on a value obtained by filtering an operation amount of an accelerator pedal.

SUMMARY

The above filtering is required to set an operation amount of the throttle valve of the internal combustion engine mounted on the vehicle to an appropriate operation amount in accordance with the operation amount of the accelerator pedal, and thus it is necessary that an expert should spend many man-hours to optimize the filtering. Thus, an expert has hitherto spent many man-hours to optimize an operation amount etc. of an electronic device in the vehicle in accordance with the state of the vehicle.

A first aspect of the present disclosure relates to a vehicle control device. The vehicle control device includes a storage device and a processor. The storage device is configured to store relationship prescription data that prescribe a relationship between a state of a vehicle and an action variable that is a variable related to an operation of an electronic device in the vehicle. The processor is configured to: acquire a detection value from a sensor that detects the state of the vehicle; operate the electronic device based on a value of the action variable determined in accordance with the detection value that is acquired and the relationship prescription data that are read from the storage device; calculate, based on the detection value that is acquired, a reward so as to be large in the case where a characteristic of the vehicle meets a predetermined criterion compared to the case where the characteristic of the vehicle does not meet the predetermined criterion; and update the relationship prescription data using, as inputs to updated mapping determined in advance, the state of the vehicle that is based on the detection value that is acquired, the value of the action variable that is used to operate the electronic device, and the reward corresponding to the operation of the electronic device when a computation load on the processor is equal to or less than a predetermined load. The updated mapping outputs the relationship prescription data that have been updated so as to increase an expected profit for the reward for the case where the electronic device is operated in accordance with the relationship prescription data.

With the configuration described above, it is possible to grasp what reward can be obtained through an operation of the electronic device by calculating a reward that accompanies such an operation. The relationship between the state of the vehicle and the action variable can be set to be appropriate for travel of the vehicle by updating the relationship prescription data using the updated mapping that has been subjected to reinforcement learning based on the reward. Thus, the number of man-hours required of an expert in setting the relationship between the state of the vehicle and the action variable can be reduced.

A computation load on an execution device is increased by executing an update process. Thus, with the configuration described above, it is possible to suppress the effect of execution of the update process on other tasks to be executed by the execution device, by executing the update process when the computation load is equal to or less than a predetermined load.

In the vehicle control device according to the first aspect described above, the processor may be configured to acquire a detection value from a sensor that detects the state of the vehicle that includes an internal combustion engine. The processor may be configured to operate the electronic device that controls the internal combustion engine. The processor may be configured to update the relationship prescription data by assuming that the computation load is equal to or less than the predetermined load when a rotational speed of a crankshaft of the internal combustion engine is equal to or less than a predetermined speed.

A process of operating an operable portion of the internal combustion engine in order to control a control amount of the internal combustion engine includes a process performed in accordance with the intervals of appearance of a compression top dead center. Thus, the computation load for controlling the internal combustion engine is large in the case where the rotational speed of the crankshaft is high compared to the case where such a rotational speed is low. Thus, with the configuration described above, it is possible to suppress the computation load on the execution device being excessive because of the computation load related to control on the control amount of the internal combustion engine and the computation load for the update process, by executing the update process when the rotational speed is equal to or less than the predetermined speed.

In the vehicle control device according to the first aspect described above, the processor may be configured to update the relationship prescription data by assuming that the computation load is equal to or less than the predetermined load when the vehicle is stationary. The computation load on the execution device tends to be large when the vehicle is traveling compared to when the vehicle is stationary. Thus, with the configuration described above, it is possible to suppress the computation load on the execution device being excessive because of the computation load due to a process executed by the execution device along with travel of the vehicle and the computation load due to the update process, by executing the update process when the vehicle is stationary.

A second aspect of the present disclosure relates to a vehicle control system. The vehicle control system includes a first processor and a storage device mounted on a vehicle, and a second processor disposed outside the vehicle. The storage device is configured to store relationship prescription data that prescribe a relationship between a state of a vehicle and an action variable that is a variable related to an operation of an electronic device in the vehicle. The first processor is configured to: acquire a detection value from a sensor that detects the state of the vehicle; operate the electronic device based on a value of the action variable determined in accordance with the detection value that is acquired and the relationship prescription data that are read from the storage device; calculate, based on the detection value that is acquired, a reward so as to be large in the case where a characteristic of the vehicle meets a predetermined criterion compared to the case where the characteristic of the vehicle does not meet the predetermined criterion; and transmit, to the second processor, the state of the vehicle that is based on the detection value that is acquired, the value of the action variable that is used to operate the electronic device, and the reward corresponding to the operation of the electronic device when a computation load on the first processor is equal to or less than a predetermined load. The second processor is configured to: receive the state of the vehicle that is based on the detection value that is acquired, the value of the action variable that is used to operate the electronic device, and the reward corresponding to the operation of the electronic device, which are transmitted from the first processor; update the relationship prescription data using, as inputs to updated mapping determined in advance, the state of the vehicle that is based on the detection value that is acquired, the value of the action variable that is used to operate the electronic device, and the reward corresponding to the operation of the electronic device; and transmit the relationship prescription data that is updated to the storage device of the vehicle. The updated mapping outputs the relationship prescription data that have been updated so as to increase an expected profit for the reward for the case where the electronic device is operated in accordance with the relationship prescription data.

With the configuration described above, the computation load on the first execution device can be reduced by the second execution device executing the update process. Moreover, it is possible to suppress the computation load on the first execution device being excessive because of a computation load due to a vehicle-side transmission process, by the first execution device executing the vehicle-side transmission process when the computation load is equal to or less than the predetermined load.

A third aspect of the present disclosure relates to a vehicle control method. The vehicle includes a storage device configured to store relationship prescription data that prescribe a relationship between a state of a vehicle and an action variable that is a variable related to an operation of an electronic device in the vehicle and a processor. The vehicle control method includes: by the processor, acquiring a detection value from a sensor that detects the state of the vehicle; by the processor, operating the electronic device based on a value of the action variable determined in accordance with the detection value that is acquired and the relationship prescription data that are read from the storage device; by the processor, calculating, based on the detection value that is acquired, a reward so as to be large in the case where a characteristic of the vehicle meets a predetermined criterion compared to the case where the characteristic of the vehicle does not meet the predetermined criterion; and by the processor, updating the relationship prescription data using, as inputs to updated mapping determined in advance, the state of the vehicle that is based on the detection value that is acquired, the value of the action variable that is used to operate the electronic device, and the reward corresponding to the operation of the electronic device when a computation load on the processor is equal to or less than a predetermined load. The updated mapping outputs the relationship prescription data that have been updated so as to increase an expected profit for the reward for the case where the electronic device is operated in accordance with the relationship prescription data.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

First Embodiment

Figure 1:
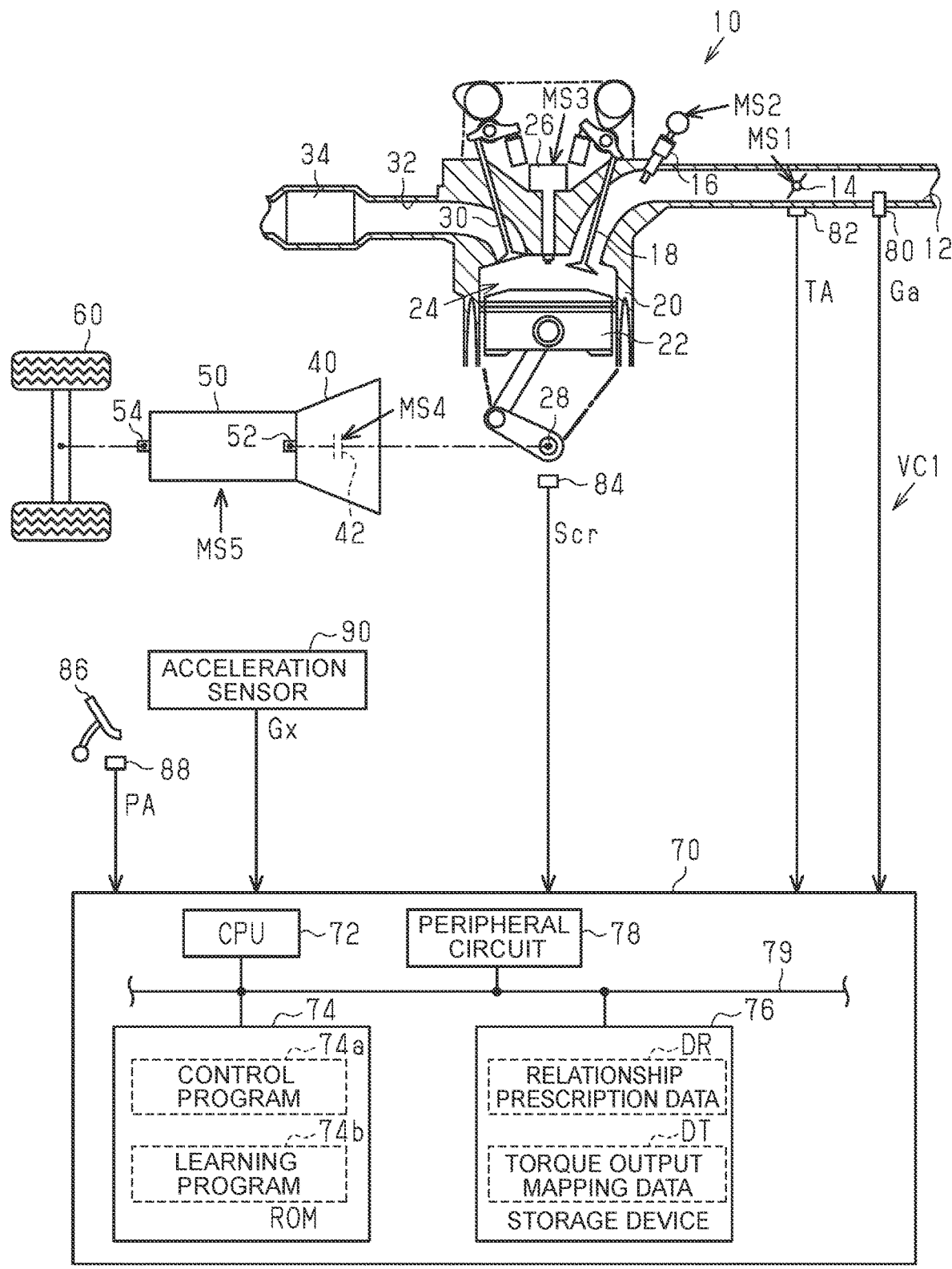
FIG. 1 illustrates a control device and a drive system according to a first embodiment.

A vehicle control device according to a first embodiment will be described below with reference to the drawings. FIG. 1 illustrates the configuration of a drive system and a control device of a vehicle VC1 according to the present embodiment.

As illustrated in FIG. 1, a suction passage 12 of an internal combustion engine 10 is provided with a throttle valve 14 and a fuel injection valve 16 which are arranged in this order from the upstream side. Air suctioned into the suction passage 12 and fuel injected from the fuel injection valve 16 flows into a combustion chamber 24 defined by a cylinder 20 and a piston 22 as a suction valve 18 opens. A mixture of the fuel and the air is combusted in the combustion chamber 24 as an ignition device 26 discharges a spark, and energy generated through combustion is converted into rotational energy of a crankshaft 28 via the piston 22. The mixture that has been combusted is discharged to an exhaust passage 32 as exhaust as an exhaust valve 30 opens. The exhaust passage 32 is provided with a catalyst 34 which serves as a post-processing device that reduces the exhaust.

An input shaft 52 of a speed change device 50 can be mechanically coupled to the crankshaft 28 via a torque converter 40 with a lock-up clutch 42. The speed change device 50 is a device that varies a speed ratio that is the ratio between the rotational speed of the input shaft 52 and the rotational speed of an output shaft 54. Drive wheels 60 are mechanically coupled to the output shaft 54.

A control device 70 controls the internal combustion engine 10, and operates operable portions of the internal combustion engine 10 such as the throttle valve 14, the fuel injection valve 16, and the ignition device 26 in order to control torque, the exhaust component ratio, etc. that are control amounts of the internal combustion engine 10. The control device 70 also controls the torque converter 40, and operates the lock-up clutch 42 in order to control the state of engagement of the lock-up clutch 42. The control device 70 also controls the speed change device 50, and operates the speed change device 50 in order to control the speed ratio that is a control amount of the speed change device 50. In FIG. 1, respective operation signals MS1 to MS5 for the throttle valve 14, the fuel injection valve 16, the ignition device 26, the lock-up clutch 42, and the speed change device 50 are indicated.

In order to control the control amounts, the control device 70 references a suctioned air amount Ga detected by an airflow meter 80, an opening degree (throttle opening degree TA) of the throttle valve 14 detected by a throttle sensor 82, and an output signal Scr from a crank angle sensor 84. The control device 70 also references a depression amount (accelerator operation amount PA) of an accelerator pedal 86 detected by an accelerator sensor 88 and an acceleration Gx in the front-rear direction of the vehicle VC1 detected by an acceleration sensor 90.

The control device 70 includes a central processing unit (CPU) 72, a read-only memory (ROM) 74, a non-volatile memory (storage device 76) that is electrically rewritable, and a peripheral circuit 78, which can communicate with each other via a local network 79. The peripheral circuit 78 includes a circuit that generates a clock signal that prescribes internal operation, a power source circuit, a reset circuit, etc.

The ROM 74 stores a control program 74a and a learning program 74b. Meanwhile, the storage device 76 stores relationship prescription data DR that prescribes the relationship among the accelerator operation amount PA, a command value for the throttle opening degree TA (throttle opening degree command value TA*), and a retardation amount aop of the ignition device 26. The retardation amount aop is the amount of retardation with respect to a reference ignition timing determined in advance. The reference ignition timing is one of a maximum brake torque (MBT) ignition timing and a knock limit point that is on the retarded side. The MBT ignition timing is the ignition timing (maximum torque ignition timing) at which maximum torque is obtained. The knock limit point is the limit value of advancement of the ignition timing at which knocking can be within the allowable level under the best condition assumed when high-octane fuel with a high knock limit is used. The storage device 76 also stores torque output mapping data DT. Torque output mapping prescribed by the torque output mapping data DT is mapping that receives a rotational speed NE of the crankshaft 28, a charging efficiency η, and the ignition timing as inputs and that outputs torque Trq.

Figure 2:
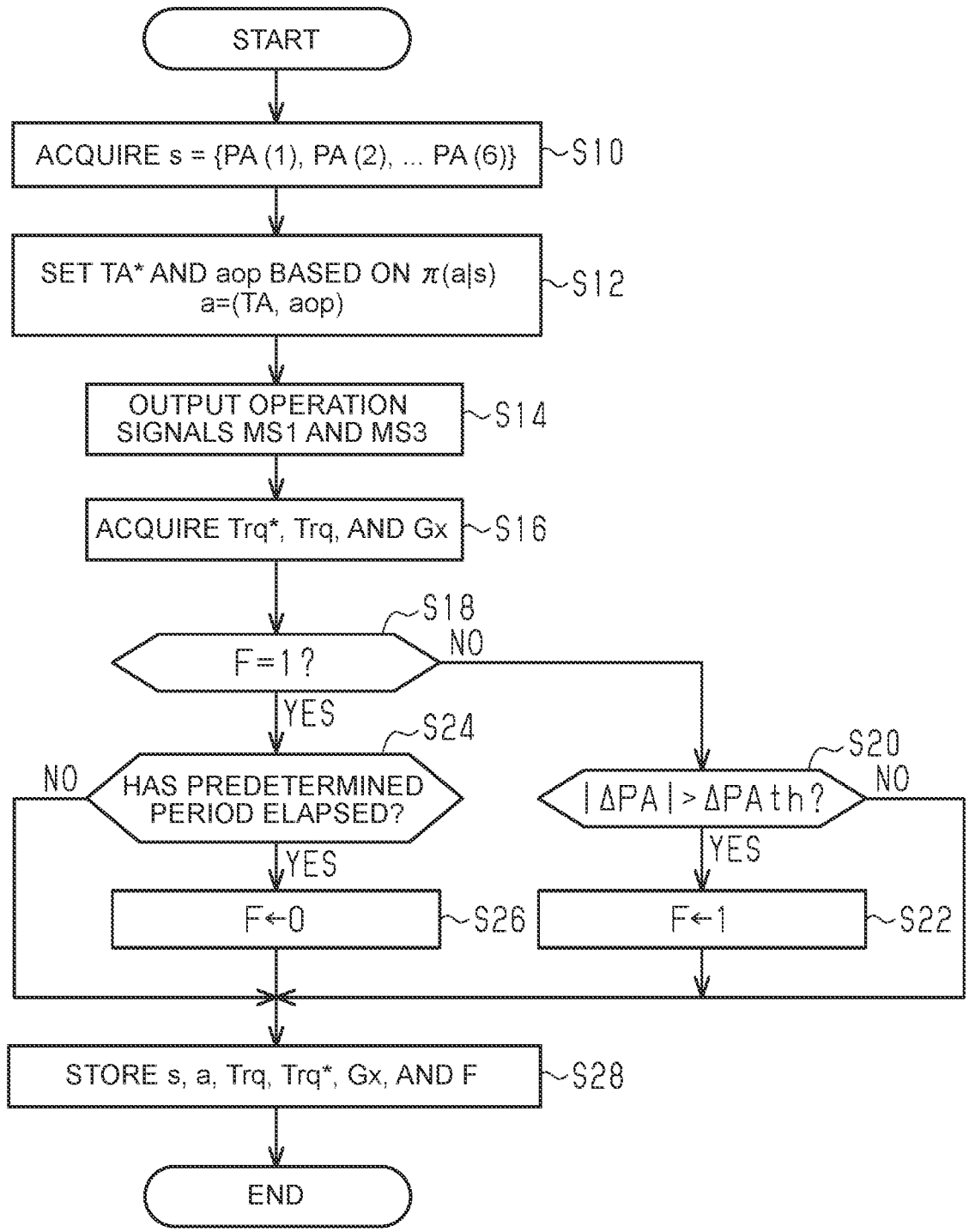
FIG. 2 is a flowchart illustrating procedures of processes executed by the control device according to the first embodiment.

FIG. 2 illustrates the procedures of processes executed by the control device 70 according to the present embodiment. The processes indicated in FIG. 2 are implemented when the CPU 72 executes the control program 74a, which is stored in the ROM 74, repeatedly at predetermined periods, for example. In the following, respective step numbers of the processes are indicated by numbers preceded by the letter "S".

In the sequence of processes indicated in FIG. 2, the CPU 72 first acquires, as a state s, chronological data composed of six sampled values "PA (1), PA (2), . . . PA (6)" of the accelerator operation amount PA (S10). The sampled values that constitute the chronological data have been sampled at different timings. In the present embodiment, the chronological data are constituted from six sampled values that have been sampled at constant sampling periods and that are chronologically adjacent to each other.

Next, the CPU 72 sets an action a composed of the throttle opening degree command value TA* and the retardation amount aop that match the state s that is acquired in the process in S10 in accordance with a policy π determined by the relationship prescription data DR (S12).

In the present embodiment, the relationship prescription data DR are data for determining an action value function Q and the policy π. In the present embodiment, the action value function Q is a table-type function that indicates the value of an expected profit that matches eight-dimensional independent variables of the state s and the action a. The policy π determines a rule for preferentially selecting, given the state s, an action a (greedy action) that maximizes the action value function Q with the independent variables establishing the state s and selecting the other actions a at a predetermined probability ε.

Particularly, the number of values that the independent variables of the action value function Q according to the present embodiment may take is obtained by excluding, through human findings etc., some of all combinations of the values that the state s and the action a may take. That is, an event in which one of two adjacent sampled values of chronological data on the accelerator operation amount PA takes a minimum value while the other takes a maximum value, for example, could not be caused through a human operation of the accelerator pedal 86, and thus the action value function Q is not defined for such an event. In the present embodiment, the number of values that the state s that defines the action value function Q may take is limited to the fourth power of 10 or less, more preferably the third power of 10 or less, by reducing dimensionality based on human findings etc.

Next, the CPU 72 outputs the operation signal MS1 to the throttle valve 14 to operate the throttle opening degree TA, and outputs the operation signal MS3 to the ignition device 26 to operate the ignition timing, based on the throttle opening degree command value TA* and the retardation amount aop that have been set (S14). In the present embodiment, feedback control is performed to the throttle opening degree command value TA* with the throttle opening degree TA, and thus the operation signal MS1 may take different values even when the throttle opening degree command value TA* is the same. In the case where known knock control (KCS) etc. is performed, for example, the ignition timing is determined by feedback-correcting, through KCS, a value obtained by retarding the reference ignition timing using the retardation amount aop. The reference ignition timing is variably set by the CPU 72 in accordance with the rotational speed NE of the crankshaft 28 and the charging efficiency η. The rotational speed NE is calculated by the CPU 72 based on the output signal Scr from the crank angle sensor 84. The charging efficiency η is calculated by the CPU 72 based on the rotational speed NE and the suctioned air amount Ga.

Next, the CPU 72 acquires the torque Trq of the internal combustion engine 10, the torque command value Trq* for the internal combustion engine 10, and the acceleration Gx (S16). The CPU 72 calculates the torque Trq by inputting the rotational speed NE, the charging efficiency η, and the ignition timing to the torque output mapping. The CPU 72 sets the torque command value Trq* in accordance with the accelerator operation amount PA.

Next, the CPU 72 determines whether a transition flag F is "1" (S18). The transition flag F indicates that transient operation is performed in the case where the transition flag F is "1", and that transient operation is not performed in the case where the transition flag F is "0". In the case where it is determined that the transition flag F is "0" (S18: NO), the CPU 72 determines whether the absolute value of an amount of variation ΔPA in the accelerator operation amount PA per unit time is equal to or more than a predetermined amount ΔPAth (S20). The amount of variation ΔPA may be the difference between the latest accelerator operation amount PA at the timing of execution of the process in S20 and the accelerator operation amount PA a unit time earlier than the above timing, for example.

In the case where it is determined that the absolute value of the amount of variation ΔPA is equal to or more than the predetermined amount ΔPAth (S20: YES), the CPU 72 substitutes "1" into the transition flag F (S22). Meanwhile, in the case where it is determined that the transition flag F is "1" (S18: YES), the CPU 72 determines whether a predetermined period has elapsed since the timing of execution of the process in S22 (S24). The predetermined period is a period until a state in which the absolute value of the amount of variation ΔPA in the accelerator operation amount PA per unit time is equal to or less than a prescribed amount that is less than the predetermined amount ΔPAth continues for a predetermined time. In the case where it is determined that the predetermined period has elapsed (S24: YES), the CPU 72 substitutes "0" into the transition flag F (S26).

The CPU 72 proceeds to the process in S28 in the case where the processes in S22 and S26 are completed and in the case where a negative determination is made in the processes in S20 and S24. In the process in S28, the CPU 72 stores, in the storage device 76, the state s acquired in the process in S10, the action a set in the process in S12, the torque Trq, the torque command value Trq*, and the acceleration Gx that are acquired in the process in S16, and the current value of the transition flag F. The CPU 72 temporarily ends the sequence of processes indicated in FIG. 2 in the case where the process in S28 is completed.

Figure 3:
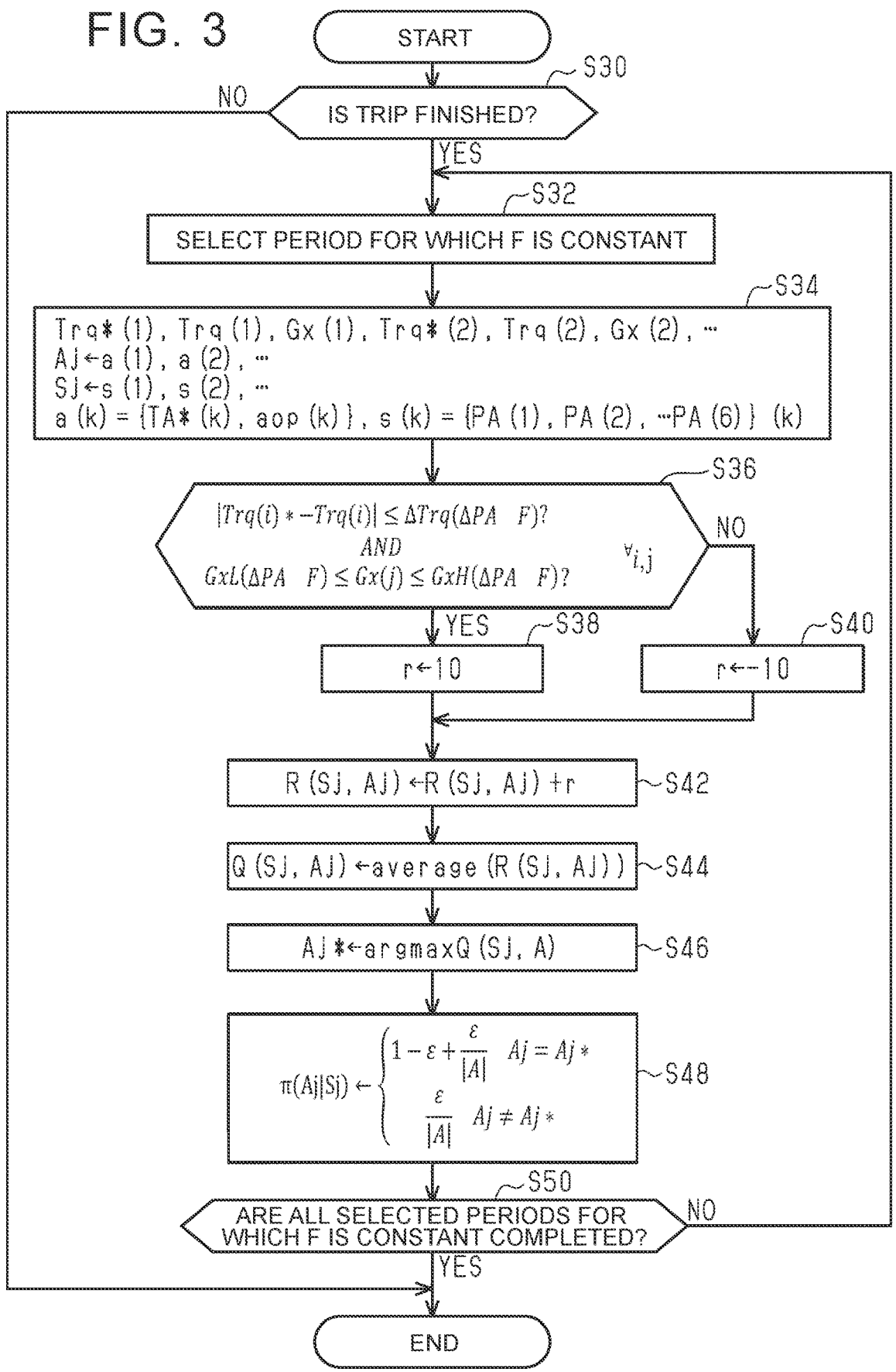
FIG. 3 is a flowchart illustrating procedures of processes executed by the control device according to the first embodiment.

FIG. 3 illustrates the procedures of processes executed by the control device 70 according to the present embodiment. The processes indicated in FIG. 3 are implemented when the CPU 72 executes the learning program 74b, which is stored in the ROM 74, repeatedly at predetermined periods, for example.

In the sequence of processes indicated in FIG. 3, the CPU 72 first determines whether a trip is finished (S30). The trip is a single period for which a travel permission signal for the vehicle is on. In the present embodiment, the travel permission signal corresponds to an ignition signal.

In the case where it is determined that the trip is finished (S30: YES), the CPU 72 selects a single period for which the transition flag F is constant, that is, a single episode (S32). Each episode is a period since the process in S26 is performed until the process in S22 is performed or a period since the process in S22 is performed until the process in S26 is performed.

Next, the CPU 72 reads chronological data composed of a set of three sampled values of the torque command value Trq*, the torque Trq, and the acceleration Gx and chronological data on the state s and the action a in the single episode selected in the process in S32 as data to be utilized in the following processes (S34). In FIG. 3, values with different numbers in the parentheses are values of variables taken at different sampling timings. For example, a torque command value Trq* (1) and a torque command value Trq* (2) are taken at different sampling timings. In addition, chronological data on the action a that belong to the selected episode are defined as an action set Aj, and chronological data on the state s that belong to the same episode are defined as a state set Sj.

Next, the CPU 72 determines whether the logical product of a condition (a) that the absolute value of the difference between any torque Trq and torque command value Trq* that belong to the selected episode is equal to or less than a prescribed amount ΔTrq and a condition (b) that the acceleration Gx is equal to or more than a lower limit value GxL and equal to or less than an upper limit value GxH is true (S36).

The CPU 72 variably sets the prescribed amount ΔTrq in accordance with the sign of the amount of variation ΔPA in the accelerator operation amount PA per unit time and the value of the transition flag F at the start of the episode. That is, in the case of an episode with the transition flag F being "1", the CPU 72 determines that the episode relates to a transient time, and sets the prescribed amount ΔTrq to a large value compared to the case where the transition flag F is "0". In addition, the CPU 72 sets the prescribed amount ΔTrq to different values in accordance with the sign of the amount of variation ΔPA.

In addition, the CPU 72 variably sets the lower limit value GxL in accordance with the sign of the amount of variation ΔPA in the accelerator operation amount PA and the value of the transition flag F at the start of the episode. That is, in the case where the episode relates to a transient time and the amount of variation ΔPA is positive, the CPU 72 sets the lower limit value GxL to a large value compared to the case where the episode relates to a stationary time. In the case where the episode relates to a transient time and the amount of variation ΔPA is negative, meanwhile, the CPU 72 sets the lower limit value GxL to a small value compared to the case where the episode relates to a stationary time.

In addition, the CPU 72 variably sets the upper limit value GxH in accordance with the sign of the amount of variation ΔPA in the accelerator operation amount PA per unit time and the value of the transition flag F at the start of the episode. That is, in the case where the episode relates to a transient time and the amount of variation ΔPA is positive, the CPU 72 sets the upper limit value GxH to a large value compared to the case where the episode relates to a stationary time. In the case where the episode relates to a transient time and the amount of variation ΔPA is negative, meanwhile, the CPU 72 sets the upper limit value GxH to a small value compared to the case where the episode relates to a stationary time.

In the case where it is determined that the logical product is true (S36: YES), the CPU 72 substitutes "10" into a reward r (S38). In the case where it is determined that the logical product is false (S36: NO), on the other hand, the CPU 72 substitutes "−10" into the reward r (S40). The CPU 72 updates the relationship prescription data DR stored in the storage device 76 illustrated in FIG. 1 in the case where the process in S38 or S40 is completed. In the present embodiment, an ε-soft on-policy Monte Carlo method is used.

That is, the CPU 72 adds the reward r to a profit R (Sj, Aj) that is determined by a set of each state and a corresponding action read in the process in S34 (S42). "R (Sj, Aj)" is a general expression of the profit R in which one of the elements of the state set Sj is used as the state and one of the elements of the action set Aj is used as the action. Next, each profit R (Sj, Aj) that is determined by a set of each state and a corresponding action read in the process in S34 is averaged and substituted into a corresponding action value function Q (Sj, Aj) (S44). Averaging may be a process of dividing the profit R, which is calculated in the process in S42, by a number obtained by adding a predetermined number to the number of times the process in S42 is performed. The initial value of the profit R may be the initial value of the action value function Q.

Next, the CPU 72 substitutes an action with a set of the throttle opening degree command value TA* and the retardation amount aop with the maximum value, of the action value function Q (Sj, A) corresponding to each state read in the process in S34, into an action Aj* (S46). "A" indicates any action that may be taken. The action Aj* may have different values in accordance with the type of the state that is read in the process in S34, but is denoted by the same symbol for simple notation.

Next, the CPU 72 updates the policy π (Aj|Sj) corresponding to each state read in the process in S34 (S48). That is, when the total number of actions is defined as "|A|", the probability of selecting the action Aj* that is selected in S46 is "1−ε+ε/|A|" In addition, the probability of selecting each of the "|A|−1" actions other than the action Aj* is "ε/|A|". The process in S48 is based on the action value function Q that has been updated in the process in S44, and thus the relationship prescription data DR that prescribe the relationship between the state s and the action a are updated so as to increase the profit R.

In the case where the process in S48 is completed, the CPU 72 determines whether the processes in S34 to S48 are completed with all the episodes stored in the process in S28 selected in the process in S32 (S50). In the case where it is determined that there is any unselected episode (S50: NO), the CPU 72 returns to the process in S32, and selects the unselected episode. On the contrary, the CPU 72 temporarily ends the sequence of processes indicated in FIG. 3 in the case where it is determined that all the episodes have been selected (S50: YES) or in the case where a negative determination is made in the process in S30.

The function and the effect of the present embodiment will be described. The CPU 72 acquires chronological data on the accelerator operation amount PA along with an operation of the accelerator pedal 86 by the user, and sets an action a composed of the throttle opening degree command value TA* and the retardation amount aop in accordance with the policy π. The CPU 72 basically selects an action a that maximizes the expected profit based on the action value function Q prescribed by the relationship prescription data DR. It should be noted, however, that the CPU 72 explores an action a that maximizes the expected profit by selecting actions other than the action a that maximizes the expected profit at a predetermined probability ε. Consequently, the relationship prescription data DR can be updated through reinforcement learning along with operation of the vehicle VC1 by the user. Thus, the throttle opening degree command value TA* and the retardation amount aop that match the accelerator operation amount PA can be set to values that are appropriate for travel of the vehicle VC1 without excessively increasing the number of man-hours spent by an expert.

In the present embodiment, in particular, the update process is performed at the end of a trip. At the end of a trip, the computation load related to control of the internal combustion engine 10 is small compared to that during the trip, and thus the computation load on the CPU 72 is relatively small. Therefore, the processes in S32 to S50 can be suitably executed by the CPU 72.

According to the present embodiment described above, the following functions and effects can be further obtained.
(1) Chronological data on the accelerator operation amount PA are included in the independent variables of the action value function Q. Consequently, the value of the action a can be adjusted finely for various variations in the accelerator operation amount PA compared to the case where only a single sampled value of the accelerator operation amount PA is used as the independent variable.
(2) The throttle opening degree command value TA* is included in the independent variables of the action value function Q. Consequently, it is easy to enhance the degree of freedom in the exploration through reinforcement learning compared to the case where a parameter etc. of a model formula obtained by modeling the behavior of the throttle opening degree command value TA* etc. is used as the independent variable related to the throttle opening degree, for example.

Second Embodiment

A second embodiment will be described below with reference to the drawings, mainly with regard to differences from the first embodiment.

Figure 4:
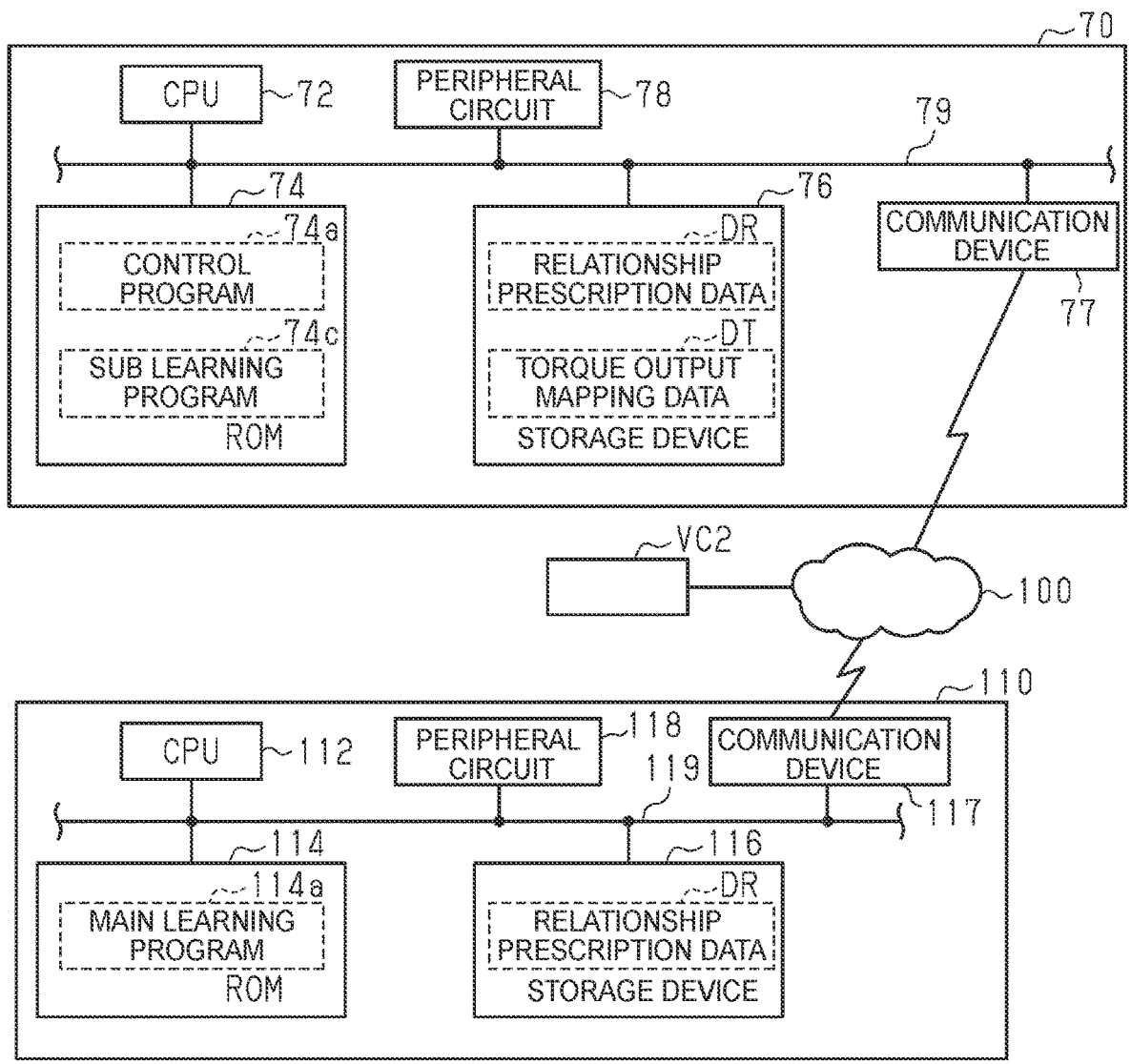
FIG. 4 illustrates a configuration of a vehicle control system according to a second embodiment.

FIG. 4 illustrates the configuration of a control system that executes reinforcement learning according to the present embodiment. In FIG. 4, members corresponding to the members illustrated in FIG. 1 are given the same reference numerals for convenience.

The ROM 74 in the vehicle VC1 illustrated in FIG. 4 stores a sub learning program 74c in addition to the control program 74a. In addition, the control device 70 includes a communication device 77. The communication device 77 is a device that communicates with a data analysis center 110 via a network 100 that is external to the vehicle VC1.

The data analysis center 110 analyzes data transmitted from a plurality of vehicles VC1, VC2, . . . . The data analysis center 110 includes a CPU 112, a ROM 114, a non-volatile memory (storage device 116) that is electrically rewritable, a peripheral circuit 118, and a communication device 117, which can communicate with each other via a local network 119. The ROM 114 stores a main learning program 114a. The storage device 116 stores the relationship prescription data DR.

Figure 5:
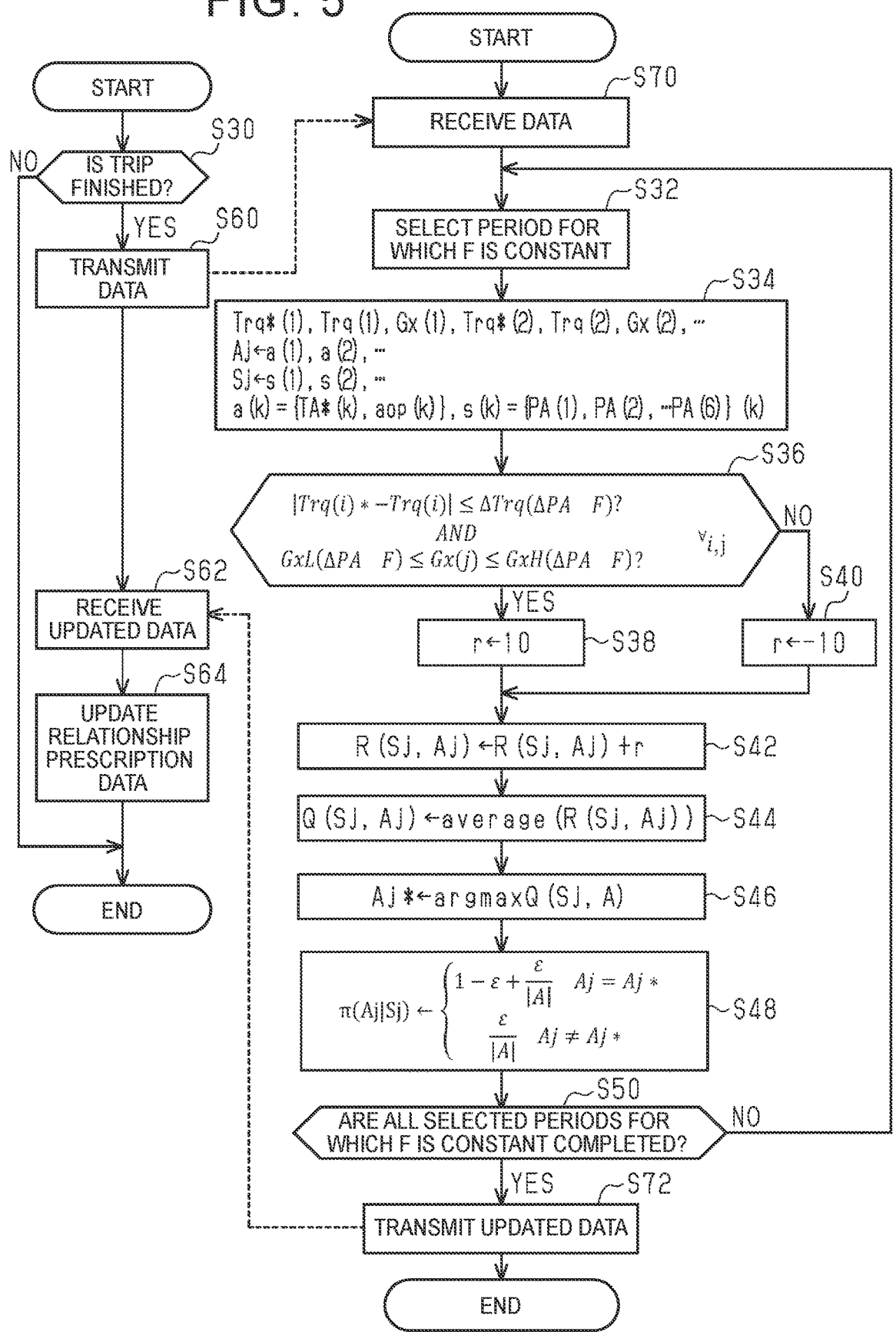
FIG. 5 is a flowchart illustrating procedures of processes executed by the vehicle control system.

FIG. 5 illustrates the procedures of processes for reinforcement learning according to the present embodiment. The processes indicated in left side of FIG. 5 are implemented when the CPU 72 executes the sub learning program 74c stored in the ROM 74 illustrated in FIG. 4. Meanwhile, the processes indicated in right side of FIG. 5 are implemented when the CPU 112 executes the main learning program 114a stored in the ROM 114. In FIG. 5, processes corresponding to the processes indicated in FIG. 3 are given the same step numbers for convenience. The processes indicated in FIG. 5 will be described below along the chronological order of reinforcement learning.

In the sequence of processes indicated in left side of FIG. 5, the CPU 72 transmits data that are necessary to update the relationship prescription data DR by operating the communication device 77 in the case where an affirmative determination is made in the process in S30 (S60). That is, the CPU 72 transmits chronological data on the state s, the action a, the torque Trq, the torque command value Trq*, the acceleration Gx, and the transition flag F that are stored in the process in S28 for the trip.

Meanwhile, as illustrated in right side of FIG. 5, the CPU 112 receives the data transmitted in the process in S60 (S70), and executes the processes in S32 to S50. In the case where an affirmative determination is made in the process in S50, the CPU 112 transmits the updated relationship prescription data DR by operating the communication device 117 (S72). The CPU 112 temporarily ends the sequence of processes indicated in right side of FIG. 5 in the case where the process in S72 is completed.

Meanwhile, as illustrated in left side of FIG. 5, the CPU 72 receives the updated relationship prescription data DR (S62), and overwrites the relationship prescription data DR to be used in the process in S12 with the received data (S64).

The CPU 72 temporarily ends the sequence of processes indicated in left side of FIG. 5 in the case where the process in S64 is completed or in the case where a negative determination is made in the process in S30. Thus, in the present embodiment, the computation load on the CPU 72 can be reduced by the data analysis center 110 executing the process of updating the relationship prescription data DR.

According to the present embodiment described above, the following functions and effects can be further obtained.

(3) The CPU 72 transmits data that are necessary to update the relationship prescription data DR at the end of a trip. Consequently, the computation load that is necessary for transmission during a trip can be reduced compared to the case where data are transmitted during the trip.

Correspondence

The correspondence between the matters in the embodiments described above and the matters described in "SUMMARY" is as follows.

The CPU 72 and the ROM 74 in the embodiments can be regarded as the execution device in the present disclosure. The storage device 76 in the embodiments can be regarded as the storage device in the present disclosure. The processes in S10 and S16 in the embodiments can be regarded as the acquisition process in the present disclosure. The process in S14 in the embodiments can be regarded as the operation process in the present disclosure. The processes in S36 to S40 in the embodiments can be regarded as the reward calculation process in the present disclosure. The processes in S42 to S48 in the embodiments can be regarded as the update process in the present disclosure. The mapping prescribed by a command included in the learning program 74b to execute the processes in S42 to S48 in the embodiments can be regarded as the updated mapping in the present disclosure. The time at the end of a trip in the embodiments can be regarded as the time when the computation load is equal to or less than a predetermined load in the present disclosure. The CPU 72 and the ROM 74 in the embodiments can be regarded as the first execution device in the present disclosure. The CPU 112 and the ROM 114 in the embodiments can be regarded as the second execution device in the present disclosure. The process in S60 in the embodiments can be regarded as the vehicle-side transmission process in the present disclosure. The process in S62 in the embodiments can be regarded as the vehicle-side reception process in the present disclosure. The processes in S70 in the embodiments can be regarded as the external reception process in the present disclosure. The process in S72 in the embodiments can be regarded as the external transmission process in the present disclosure.

OTHER EMBODIMENTS

The embodiments may be modified as follows. The embodiments and the following modifications can be combined with each other unless such embodiments and modifications technically contradict with each other.

Action Variable

While the throttle opening degree command value TA* is used as a variable related to the opening degree of the throttle valve as an action variable in the embodiments described above, an applicable embodiment of the present disclosure is not limited thereto. For example, the response of the throttle opening degree command value TA* to the accelerator operation amount PA may be expressed using a dead time and a second-order delay filter, and a total of three variables, namely the dead time and two variables that prescribe the second-order delay filter, may be used as variables related to the opening degree of the throttle valve. In that case, however, it is desirable that the state variable should be an amount of variation in the accelerator operation amount PA per unit time, rather than chronological data on the accelerator operation amount PA.

While the retardation amount aop is used as a variable related to the ignition timing as an action variable in the embodiments described above, an applicable embodiment of the present disclosure is not limited thereto. For example, the ignition timing to be corrected through KCS itself may be used as such a variable.

While a variable related to the opening degree of the throttle valve and a variable related to the ignition timing are used as action variables in the embodiments described above, an applicable embodiment of the present disclosure is not limited thereto. For example, the fuel injection amount may be used in addition to a variable related to the opening degree of the throttle valve and a variable related to the ignition timing. Among three such variables, alternatively, only a variable related to the opening degree of the throttle valve and the fuel injection amount may be adopted as action variables, or only a variable related to the ignition timing and the fuel injection amount may be adopted as action variables. Further, only one of three such variables may be adopted as an action variable.

In the case of an internal combustion engine of a compression ignition type, as described in "Internal Combustion Engine", a variable related to the injection amount may be used in place of a variable related to the opening degree of the throttle valve, and a variable related to the injection timing may be used in place of a variable related to the ignition timing. It is desirable that a variable related to the number of times of injection in one combustion cycle or a variable related to the time interval between the end timing of one of two chronologically adjacent fuel injections for one cylinder in one cycle and the start timing of the other should be used in addition to a variable related to the injection timing.

In the case where the speed change device 50 is a stepped speed change device, for example, a current value etc. for a solenoid valve for adjusting the engagement state of a clutch using a hydraulic pressure may be used as an action variable. In the case where a hybrid vehicle, an electric vehicle, or a fuel cell vehicle is adopted as the vehicle as described below in "Vehicle", for example, torque or output of the rotary electric machine may be used as an action variable. In the case where the vehicle includes an in-vehicle air conditioning device that includes a compressor rotated by rotational power of the crankshaft of the internal combustion engine, for example, load torque of the compressor may be included as an action variable. In the case where the vehicle includes an electric in-vehicle air conditioning device, power consumption of the air conditioning device may be included as an action variable.

State

While chronological data on the accelerator operation amount PA are data composed of six values sampled at equal intervals in the embodiments described above, an applicable embodiment of the present disclosure is not limited thereto. It is only necessary that the chronological data should be data composed of two or more values sampled at different sampling timings. In this event, it is desirable that the chronological data should be data composed of three or more sampled values, and that the chronological data should be data composed of values sampled at equal intervals.

The state variable related to the accelerator operation amount is not limited to chronological data on the accelerator operation amount PA, and may be an amount of variation in the accelerator operation amount PA per unit time as described in "Action Variable", for example.

In the case where a current value for a solenoid valve is used as an action variable as described in "Action Variable", for example, the state may include the rotational speed of the input shaft 52 of the speed change device, the rotational speed of the output shaft 54, and a hydraulic pressure regulated by the solenoid value. In the case where torque or output of the rotary electric machine is used as an action variable as described in "Action Variable", for example, the state may include the charge rate or the temperature of the battery. In the case where load torque of the compressor or power consumption of the air conditioning device is included as an action variable as described in "Action Variable", for example, the state may include the temperature in the cabin.

Relationship Prescription Data

While the action value function Q is a table-type function in the embodiments described above, an applicable embodiment of the present disclosure is not limited thereto. For example, a function approximator may also be used.

For example, the policy $\pi$ may be expressed using a function approximator that includes the state s and the action a as independent variables and that includes the probability of taking the action a as a dependent variable, instead of using the action value function Q, and a parameter that defines the function approximator may be updated in accordance with the reward r.

Reduction of Dimensionality of Data in Table Format

The method of reducing the dimensionality of data in the table format is not limited to that described in relation to the embodiments described above. For example, it is rare for the accelerator operation amount PA to take a maximum value, and thus the action value function Q may not be defined for a state in which the accelerator operation amount PA is equal to or more than a prescribed amount and the throttle opening degree command value TA* etc. for a case where the accelerator operation amount PA is equal to or more than the prescribed amount may be suitably determined separately. In addition, dimensionality may be reduced by excluding values in which the throttle opening degree command value TA* is equal to or more than a prescribed value from values an action may take, for example.

It should be noted, however, that it is not essential to reduce dimensionality. For example, when the computation capability of the CPU 72 and the storage capacity of the storage device 76 are sufficient in the second embodiment, only some of the actions that may be taken as independent variables of the action value function may be learned before shipment of the vehicle, and all the actions may be executable through exploration after the shipment. Consequently, it is possible to find a more appropriate action by increasing the number of actions that may be taken through exploration in view of the fact that sufficient learning data can be secured after the shipment compared to before the shipment.

Updated Mapping

While an $\varepsilon$-soft on-policy Monte Carlo method is used in the processes in S42 to S48, an applicable embodiment of the present disclosure is not limited thereto. For example, an off-policy Monte Carlo method may also be used. It should be noted, however, that an applicable embodiment of the present disclosure is not limited to using a Monte Carlo method. For example, an off-policy temporal difference (TD) method, an on-policy TD method such as SARSA, for example, or an eligibility trace method for on-policy learning, for example, may also be used.

In the case where the policy $\pi$ is expressed using a function approximator and directly updated based on the reward r as described in "Relationship Prescription Data", for example, updated mapping may be constituted using a policy gradient method etc.

An applicable embodiment of the present disclosure is not limited to a configuration in which only one of the action value function Q and the policy $\pi$ is directly updated in accordance with the reward r. For example, both the action value function Q and the policy $\pi$ may be updated as in an actor critic method. The actor critic method is not limited thereto, and a value function V may be updated in place of the action value function Q, for example.

"$\varepsilon$" for determining the policy $\pi$ is not limited to a fixed value, and may be changed in accordance with a rule determined in advance in accordance with the degree of progress of learning.

Reward Calculation Process

While a reward is given in accordance with whether the logical product of the condition (a) and the condition (b) is true in the processes in FIG. 3, an applicable embodiment of the present disclosure is not limited thereto. For example, a process of giving a reward in accordance with whether the condition (a) is met and a process of giving a reward in accordance with whether the condition (b) is met may be executed. Alternatively, only one of a process of giving a reward in accordance with whether the condition (a) is met and a process of giving a reward in accordance with whether the condition (b) is met may be executed, for example.

A process of giving a large reward in the case where the difference between the torque Trq and the torque command value Trq* is small compared to the case where such a difference is large may be performed, instead of giving the same reward, in the case where the condition (a) is met, for example. Alternatively, a process of giving a small reward in the case where the difference between the torque Trq and the torque command value Trq* is large compared to the case where such a difference is small may be performed, instead of giving the same reward, in the case where the condition (a) is not met, for example.

A process of giving a reward that is variable in accordance with the acceleration Gx may be performed, instead of giving the same reward in the case where the condition (b) is met, for example. Alternatively, a process of giving a reward that is variable in accordance with the acceleration Gx may be performed, instead of giving the same reward in the case where the condition (b) is not met, for example.

While the reward r is given in accordance with whether a criterion related to the drivability is met in the embodiments described above, the criterion related to the drivability is not limited to that discussed above, and may be set in accordance with whether noise or the vibration intensity meets a criterion, for example. It should be noted, however, that an applicable embodiment of the present disclosure is not limited thereto, and any one or more of four conditions, that is, whether the acceleration meets a criterion, whether the followability of the torque Trq meets a criterion, whether noise meets a criterion, and whether the vibration intensity meets a criterion, may be used, for example.

The reward calculation process is not limited to a process of giving the reward r in accordance with whether a criterion related to the drivability is met. For example, the reward calculation process may be a process of giving a large reward in the case where the fuel consumption rate meets a criterion compared to the case where the fuel consumption rate does not meet the criterion. Alternatively, the reward calculation process may be a process of giving a large reward in the case where the exhaust characteristics meet a criterion compared to the case where the exhaust characteristics do not meet the criterion, for example. Two or three of three processes, that is, a process of giving a large reward in the case where a criterion related to the drivability is met compared to the case where such a criterion is not met, a process of giving a large reward in the case where the fuel consumption rate meets a criterion compared to the case where the fuel consumption rate does not meet the criterion, and a process of giving a large reward in the case where the exhaust characteristics meet a criterion compared to the case where the exhaust characteristics do not meet the criterion, may be included.

In the case where a current value for a solenoid valve of the speed change device 50 is used as an action variable as described in "Action Variable", for example, it is only necessary that the reward calculation process should include at least one of the following three processes (a) to (c), for example.

(a) A process of giving a large reward in the case where the time required for the speed change device to change the speed ratio falls within a predetermined time compared to the case where such a time exceeds the predetermined time.
(b) A process of giving a large reward in the case where the absolute value of the variation rate of the rotational speed of the input shaft 52 of the speed change device falls within a predetermined input-side value compared to the case where such an absolute value exceeds the predetermined input-side value.
(c) A process of giving a large reward in the case where the absolute value of the variation rate of the rotational speed of the output shaft 54 of the speed change device falls within a predetermined output-side value compared to the case where such an absolute value exceeds the predetermined output-side value. In the case where torque or output of the rotary electric machine is used as an action variable as described in "Action Variable", for example, a process of giving a large reward in the case where the charge rate of the battery falls within a predetermined range compared to the case where the charge rate thereof does not fall within such a range or a process of giving a large reward in the case where the temperature of the battery falls within a predetermined range compared to the case where the temperature thereof does not fall within such a range may be included. In the case where load torque of the compressor or power consumption of the air conditioning device are included in action variables as described in "Action Variable", for example, a process of giving a large reward in the case where the temperature in the cabin falls within a predetermined range compared to the case where the temperature therein does not fall within such a range may be added.

Vehicle Control System

The vehicle control system is not limited to that composed of the control device 70 and the data analysis center 110. For example, the vehicle control system may be composed of the control device 70 and a portable terminal possessed by the user, in place of the data analysis center 110. Alternatively, the vehicle control system may be composed of the control device 70, the portable terminal, and the data analysis center 110, for example. This configuration is implemented by the portable terminal executing the process in S12, for example.

Execution Device

The execution device is not limited to that including the CPU 72 (112) and the ROM 74 (114) to execute software processing. For example, the execution device may include a dedicated hardware circuit, such as an application-specific integrated circuit (ASIC), for example, that performs hardware processing for at least some of processes subjected to software processing in the embodiments described above. That is, it is only necessary that the execution device should have any of the following configurations (a) to (c). (a) The execution device includes a processing device that executes all of the processes described above in accordance with a program and a program storage device, such as a ROM, that stores the program. (b) The execution device includes a processing device that executes some of the processes described above in accordance with a program, a program storage device, and a dedicated hardware circuit that executes the remaining processes. (c) The execution device includes a dedicated hardware circuit that executes all of the processes described above. The execution device may include a plurality of software execution devices, which each include a processing device and a program storage device, or dedicated hardware circuits.

Storage Device

While the storage device that stores the relationship prescription data DR and the storage device (ROM 74) that stores the learning program 74b and the control program 74a are separate storage devices in the embodiments described above, an applicable embodiment of the present disclosure is not limited thereto.

Internal Combustion Engine

The internal combustion engine is not limited to that including a port injection valve that injects fuel into the suction passage 12 as a fuel injection valve, and may include an in-cylinder injection valve that directly injects fuel into the combustion chamber 24, or may include both a port injection valve and an in-cylinder injection valve, for example.

The internal combustion engine is not limited to a spark-ignition internal combustion engine, and may be a compression-ignition internal combustion engine etc. which uses light oil etc. as fuel, for example.

Vehicle

The vehicle is not limited to a vehicle that includes only an internal combustion engine as a thrust generation device, and may be a so-called hybrid vehicle that includes an internal combustion engine and a rotary electric machine, for example. Alternatively, the vehicle may be a so-called electric vehicle or fuel cell vehicle that does not include an internal combustion engine but that includes a rotary electric machine as a thrust generation device.

What is claimed is:
1. A vehicle control device comprising:
a storage device configured to store relationship prescription data that prescribe a relationship between a state of a vehicle and an action variable that is a variable related to an operation of an electronic device in the vehicle; and
a processor configured to
acquire a detection value from a sensor that detects the state of the vehicle,
operate the electronic device based on a value of the action variable determined in accordance with the detection value that is acquired and the relationship prescription data that are read from the storage device,
calculate, based on the detection value that is acquired, a reward so as to be large in the case where a characteristic of the vehicle meets a predetermined criterion compared to the case where the characteristic of the vehicle does not meet the predetermined criterion, and update the relationship prescription data using, as inputs to updated mapping determined in advance, the state of the vehicle that is based on the detection value that is acquired, the value of the action variable that is used to operate the electronic device, and the reward corresponding to the operation of the electronic device when a computation load on the processor is equal to or less than a predetermined load, wherein the updated mapping outputs the relationship prescription data that have been updated so as to increase an expected profit for the reward for the case where the electronic device is operated in accordance with the relationship prescription data.

2. The vehicle control device according to claim 1, wherein:

the processor is configured to acquire a detection value from a sensor that detects the state of the vehicle that includes an internal combustion engine;

the processor is configured to operate the electronic device that controls the internal combustion engine; and the processor is configured to update the relationship prescription data by assuming that the computation load is equal to or less than the predetermined load when a rotational speed of a crankshaft of the internal combustion engine is equal to or less than a predetermined speed.

3. The vehicle control device according to claim 1, wherein the processor is configured to update the relationship prescription data by assuming that the computation load is equal to or less than the predetermined load when the vehicle is stationary.

4. The vehicle control device according to claim 1, wherein:

the processor is configured to acquire a detection value related to a drivability; and the processor is configured to calculate, based on the detection value related to the drivability that is acquired, the reward so as to be large in the case where the detection value related to the drivability meets a predetermined criterion compared to the case where the detection value related to the drivability does not meet the predetermined criterion.

5. The vehicle control device according to claim 4 wherein the detection value related to the drivability includes a torque of an internal combustion engine.

6. The vehicle control device according to claim 4 wherein the detection value related to the drivability includes an acceleration of the vehicle.

7. The vehicle control device according to claim 1, wherein:

the processor is configured to acquire a detection value related to a fuel consumption rate; and the processor is configured calculate, based on the detection value related to the fuel consumption rate that is acquired, the reward so as to be large in the case where the detection value related to the fuel consumption rate meets a predetermined criterion compared to the case where the detection value related to the fuel consumption rate does not meet the predetermined criterion.

8. The vehicle control device according to claim 1, wherein:

the processor is configured to acquire a detection value related to an exhaust characteristics; and the processor is configured calculate, based on the detection value related to the exhaust characteristics that is acquired, the reward so as to be large in the case where the detection value related to the exhaust characteristics meets a predetermined criterion compared to the case where the detection value related to the exhaust characteristics does not meet the predetermined criterion.

9. A vehicle control system comprising:

a first processor and a storage device mounted on a vehicle; and a second processor disposed outside the vehicle, wherein:

the storage device is configured to store relationship prescription data that prescribe a relationship between a state of a vehicle and an action variable that is a variable related to an operation of an electronic device in the vehicle;

the first processor is configured to acquire a detection value from a sensor that detects the state of the vehicle, operate the electronic device based on a value of the action variable determined in accordance with the detection value that is acquired and the relationship prescription data that are read from the storage device, calculate, based on the detection value that is acquired, a reward so as to be large in the case where a characteristic of the vehicle meets a predetermined criterion compared to the case where the characteristic of the vehicle does not meet the predetermined criterion, and transmit, to the second processor, the state of the vehicle that is based on the detection value that is acquired, the value of the action variable that is used to operate the electronic device, and the reward corresponding to the operation of the electronic device when a computation load on the first processor is equal to or less than a predetermined load;

the second processor is configured to receive the state of the vehicle that is based on the detection value that is acquired, the value of the action variable that is used to operate the electronic device, and the reward corresponding to the operation of the electronic device, which are transmitted from the first processor, update the relationship prescription data using, as inputs to updated mapping determined in advance, the state of the vehicle that is based on the detection value that is acquired, the value of the action variable that is used to operate the electronic device, and the reward corresponding to the operation of the electronic device, and transmit the relationship prescription data that is updated to the storage device of the vehicle; wherein the updated mapping outputs the relationship prescription data that have been updated so as to increase an expected profit for the reward for the case where the electronic device is operated in accordance with the relationship prescription data.

10. The vehicle control system according to claim 9, wherein:

the processor is configured to acquire a detection value from a sensor that detects the state of the vehicle that includes an internal combustion engine;

the processor is configured to operate the electronic device that controls the internal combustion engine; and the processor is configured to update the relationship prescription data by assuming that the computation load is equal to or less than the predetermined load when a rotational speed of a crankshaft of the internal combustion engine is equal to or less than a predetermined speed.

11. The vehicle control system according to claim 9, wherein the processor is configured to update the relationship prescription data by assuming that the computation load is equal to or less than the predetermined load when the vehicle is stationary.

12. The vehicle control system according to claim 9, wherein:
the processor is configured to acquire a detection value related to a drivability; and
the processor is configured to calculate, based on the detection value related to the drivability that is acquired, the reward so as to be large in the case where the detection value related to the drivability meets a predetermined criterion compared to the case where the detection value related to the drivability does not meet the predetermined criterion.

13. The vehicle control system according to claim 12 wherein the detection value related to the drivability includes a torque of an internal combustion engine.

14. The vehicle control system according to claim 12 wherein the detection value related to the drivability includes an acceleration of the vehicle.

15. The vehicle control system according to claim 9, wherein:
the processor is configured to acquire a detection value related to a fuel consumption rate; and
the processor is configured calculate, based on the detection value related to the fuel consumption rate that is acquired, the reward so as to be large in the case where the detection value related to the fuel consumption rate meets a predetermined criterion compared to the case where the detection value related to the fuel consumption rate does not meet the predetermined criterion.

16. The vehicle control system according to claim 9, wherein:
the processor is configured to acquire a detection value related to an exhaust characteristics; and
the processor is configured calculate, based on the detection value related to the exhaust characteristics that is acquired, the reward so as to be large in the case where the detection value related to the exhaust characteristics meets a predetermined criterion compared to the case where the detection value related to the exhaust characteristics does not meet the predetermined criterion.

17. A vehicle control method for a vehicle, the vehicle including a storage device configured to store relationship prescription data that prescribe a relationship between a state of a vehicle and an action variable that is a variable related to an operation of an electronic device in the vehicle and a processor, the vehicle control method comprising:
by the processor, acquiring a detection value from a sensor that detects the state of the vehicle;
by the processor, operating the electronic device based on a value of the action variable determined in accordance with the detection value that is acquired and the relationship prescription data that are read from the storage device;
by the processor, calculating, based on the detection value that is acquired, a reward so as to be large in the case where a characteristic of the vehicle meets a predetermined criterion compared to the case where the characteristic of the vehicle does not meet the predetermined criterion; and
by the processor, updating the relationship prescription data using, as inputs to updated mapping determined in advance, the state of the vehicle that is based on the detection value that is acquired, the value of the action variable that is used to operate the electronic device, and the reward corresponding to the operation of the electronic device when a computation load on the processor is equal to or less than a predetermined load, wherein
the updated mapping outputs the relationship prescription data that have been updated so as to increase an expected profit for the reward for the case where the electronic device is operated in accordance with the relationship prescription data.

18. The vehicle control method according to claim 17, wherein:
by the processor, acquiring a detection value related to a drivability; and
by the processor, calculating, based on the detection value related to the drivability that is acquired, the reward so as to be large in the case where the detection value related to the drivability meets a predetermined criterion compared to the case where the detection value related to the drivability does not meet the predetermined criterion.

19. The vehicle control method according to claim 18 wherein the detection value related to the drivability includes a torque of an internal combustion engine.

20. The vehicle control method according to claim 18 wherein the detection value related to the drivability includes an acceleration of the vehicle.

* * * * *